US012667091B2

(12) United States Patent    (10) Patent No.:   US 12,667,091 B2
Abbott                 (45) Date of Patent:    Jun. 30, 2026

(54) FISHING LEADER ORGANIZER

(71) Applicant: It's Play Time, LLC, Coeur d'Alene, ID (US)

(72) Inventor: Steven Blake Abbott, Coeur d'Alene, ID (US)

(73) Assignee: It's Play Time, LLC, Coeur d'Alene, ID (US)

( * ) Notice: Subject to any disclaimer, the term of this patent is extended or adjusted under 35 U.S.C. 154(b) by 0 days.

(21) Appl. No.: 19/094,798

(22) Filed: Mar. 28, 2025

(65) Prior Publication Data

US 2025/0302026 A1     Oct. 2, 2025

Related U.S. Application Data

(60) Provisional application No. 63/573,104, filed on Apr. 2, 2024.

(51) Int. Cl.

| | |
|---|---|
| *A01K 97/06* | (2006.01) |
| *A45F 5/02* | (2006.01) |
| *A01K 91/14* | (2006.01) |
| *A45F 5/00* | (2006.01) |

(52) U.S. Cl.
CPC .............. *A01K 97/06* (2013.01); *A45F 5/021* (2013.01); *A01K 91/14* (2013.01); *A45F 2005/006* (2013.01)

(58) Field of Classification Search
CPC ................................ A01K 97/06; A01K 91/14
See application file for complete search history.

(56) References Cited

U.S. PATENT DOCUMENTS

| | | | | | |
|---|---|---|---|---|---|
| 1,635,378 | A | * | 7/1927 | Mead | A01K 97/06 |
| | | | | | 242/607.1 |
| 2,138,190 | A | * | 11/1938 | Myers | A01K 97/06 |
| | | | | | 312/307 |
| 2,596,896 | A | * | 5/1952 | Goad | A01K 97/16 |
| | | | | | 43/57.2 |
| 2,756,946 | A | * | 7/1956 | Mcauley | A01K 97/06 |
| | | | | | 242/138 |
| 2,814,152 | A | * | 11/1957 | Trujillo | A01K 97/06 |
| | | | | | 43/57.1 |
| 3,032,914 | A | * | 5/1962 | Valle | A01K 97/06 |
| | | | | | 242/388.6 |
| 3,524,571 | A | * | 8/1970 | Geiger | A01K 97/06 |
| | | | | | 224/920 |

(Continued)

FOREIGN PATENT DOCUMENTS

| | | |
|---|---|---|
| CN | 2872848 Y | 2/2007 |

OTHER PUBLICATIONS

International Search Report mailed May 12, 2025 for PCT/US2025/022387 to It's Play Time, LLC, filed on Mar. 31, 2025.

*Primary Examiner* — Richard G Davis
(74) *Attorney, Agent, or Firm* — Ryan Stockett

(57) ABSTRACT

An organizer is disclosed for use in storing a plurality of fishing leaders. The organizer may include a base having an internal storage space, and a plurality of spools removably received within the internal storage space. Each of the plurality of spools is configured to receive a different one of the plurality of fishing leaders. The organizer also includes a winding location positioned external to the base and configured to removably receive at least one of the plurality of spools.

20 Claims, 8 Drawing Sheets

(56)　　　　　References Cited

U.S. PATENT DOCUMENTS

| 4,831,771 | A | * | 5/1989 | Hoffken | ................. | A01K 97/06 |
| | | | | | | D22/134 |
| 5,033,228 | A | * | 7/1991 | Gallivan | ................ | A01K 89/00 |
| | | | | | | 242/118.41 |
| 5,544,442 | A | * | 8/1996 | Perkins | ................. | A01K 97/06 |
| | | | | | | 43/57.1 |
| 6,427,377 | B1 | * | 8/2002 | Kim | ....................... | A01K 97/06 |
| | | | | | | 43/4.5 |
| 8,522,474 | B1 | | 9/2013 | Magnuson | | |
| 9,468,201 | B1 | * | 10/2016 | McGuire | ................ | A01K 97/06 |
| 2012/0255218 | A1 | | 10/2012 | Haroian | | |
| 2013/0001353 | A1 | | 1/2013 | DiCicco | | |
| 2015/0053811 | A1 | | 2/2015 | Murray et al. | | |
| 2016/0183507 | A1 | * | 6/2016 | Morehead | .............. | A01K 91/06 |
| | | | | | | 242/533 |
| 2019/0133104 | A1 | | 5/2019 | Harrell | | |

* cited by examiner

FISHING LEADER ORGANIZER

RELATED APPLICATIONS

This application is based on and claims the benefit of priority from U.S. Provisional Application No. 63/573,104 that was filed on Apr. 2, 2024, the contents of which are expressly incorporated herein by reference.

TECHNICAL FIELD

The present disclosure relates generally to an organizer and, more particularly, to an organizer for storing fishing leaders in a structured and retrievable manner.

BACKGROUND

Fishing is a popular sport enjoyed by many around the world. Several different methods of fishing are common, including bait-casting, spin-casting, and fly-casting. In each method of fishing, one or more hooks are fastened to the end of a line. In bait-casting, real or artificial bait is impaled on or otherwise connected to the hook as an attractant for the fish to bite the hook. In spin-casting, a spinner bait or lure is connected to the hook and designed to imitate a swimming action as the line is reeled in. In fly-casting, an artificial fly is formed around the hook and can be presented to the fish on top of the water using floating line or under the water using sinking line.

In some instances, a leader is connected between the main fishing line and the hook. The leader is generally made from a material different than the leader and provides a benefit over using only the main fishing line. For example, the leader may be a different color, a different weight, a different diameter, etc. that reduces its visibility to the fish in the water. The leader may also perform differently (e.g., float higher, sink slower, stretch more, kink less, resist greater abrasion, etc.) than the main line.

Regardless of the method of fishing used, it can be beneficial to have multiple different leaders prepared before a planned fishing event (e.g., "preprepared" with a variety of different hooks, baits, lures and/or flies). These preprepared leaders allow for quick changes in situ to different presentations. For example, after a period of unsuccessful fishing with a first leader and associated presentation, the first leader may be disconnected from the main fishing line (e.g., via a quick disconnect device such as that disclosed in co-pending U.S. patent application Ser. No. 18/614,501 that was filed on Mar. 22, 2024) and a second preprepared leader with a different presentation may be quickly connected to the main fishing line in place of the first leader. In order to efficiently use the preprepared leaders (e.g., without causing entanglements, snags, etc.), the leaders should be stored in a well-organized manner and quickly retrievable.

An example of leader storage tool is disclosed in U.S. Pat. No. 5,033,228 that issued to Gallivan on Jul. 23, 1991 (the '228 patent). Specifically, the '228 patent discloses a holder for a plurality of leaders. The holder includes a hollow tubular housing, an axle rotatably enclosed within the housing, and a plurality of spools mounted to the axle and configured to hold different leaders. The spools are joined by frictional means that allows slippage of fully-wound spools, but winding of a leader onto an empty spool. The leader is wound onto the empty spool by hand-rotation of the axle.

While the holder of the '228 patent may improve storage and retrievability of preprepared leaders, it may be less than optimal. For example, the holder may be complicated, with many moving parts. This complication may make assembly difficult and increase a cost of the holder. Further, because the axle passes through all of the spools, it may be difficult to access each individual spool (e.g., for loading, cleaning, and/or preparation of the spools). Further, the friction means may be difficult to engage and/or difficult for the user to know which spool is engaged.

The disclosed leader organizer is directed at addressing one or more of these issues discussed above and/or other problems of the prior art.

SUMMARY

In one aspect, the present disclosure is directed to an organizer for use in storing a plurality of fishing leaders. The organizer may include a base having an internal storage space, and a plurality of spools removably received within the internal storage space. Each of the plurality of spools is configured to receive a different one of the plurality of fishing leaders. The organizer also includes a winding location positioned external to the base and configured to removably receive at least one of the plurality of spools.

DETAILED DESCRIPTION

The term "about" as used herein serves to reasonably encompass or describe minor variations in numerical values measured by instrumental analysis or as a result of sample handling. Such minor variations may be considered to be "within engineering tolerances" and in the order of plus or minus 0% to 10%, plus or minus 0% to 5%, or plus or minus 0% to 1% of the numerical values.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Figure 1:
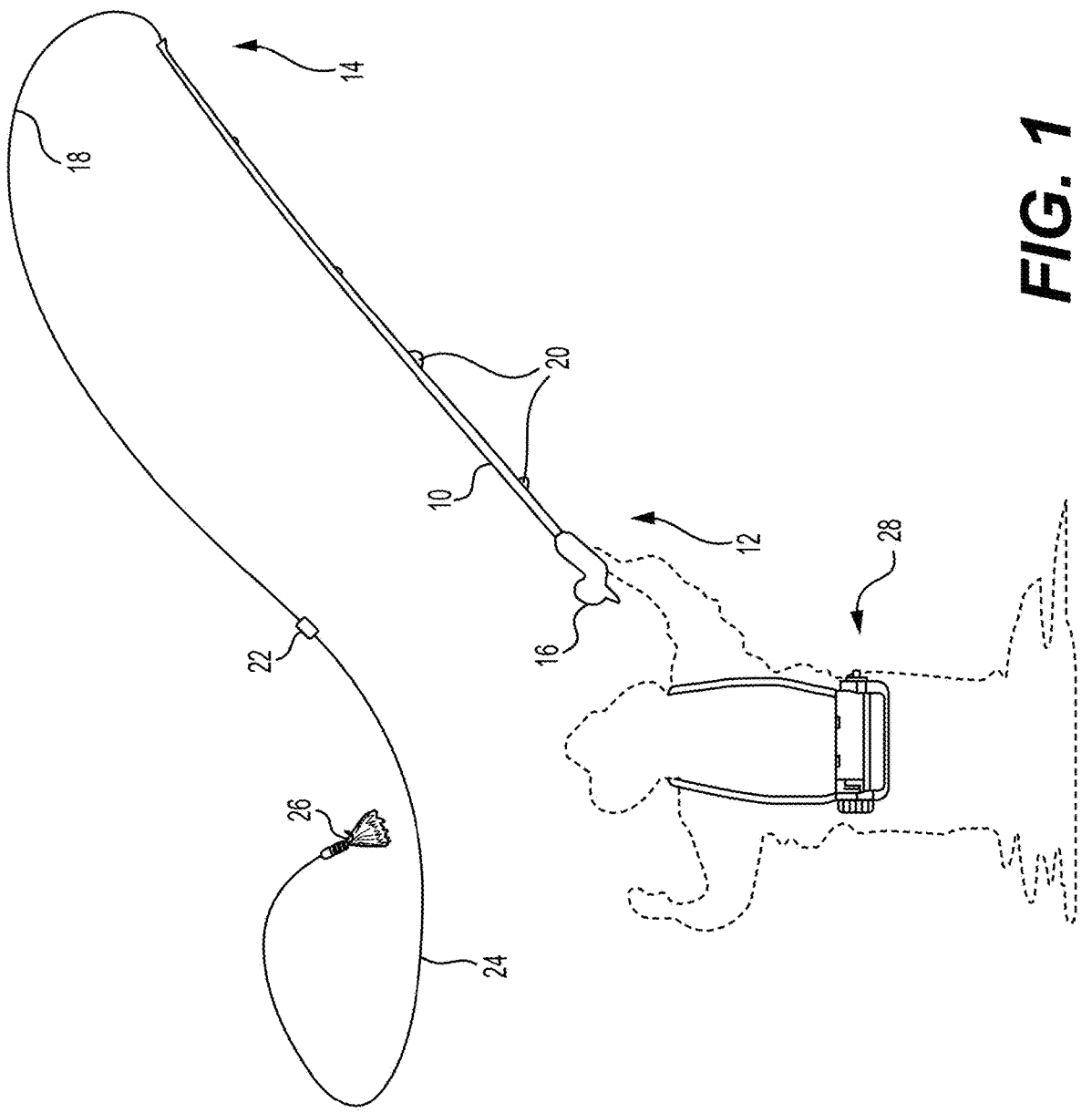
FIG. 1 is a diagrammatic illustration of an exemplary disclosed fishing setup.

FIG. 1 illustrates common fishing equipment that is set up for efficient swapping of leaders having any variety of different hooks and/or attractants attached thereto. For the purposes of this disclosure, these leaders equipped with hooks and/or attractants may be considered preprepared leaders. The fishing equipment depicted in FIG. 1 may include, among other things, a rod 10 having a base end 12 and a tip end 14, a reel 16 removably connected to base end 12, and a line 18 spooled within and/or around reel 16. A loose end of line 18 may pass through eyelets 20 that are spaced along a length of rod 10 and terminate at a connector 22. A leader 24 is shown in FIG. 1 as having a first end temporarily and removably attached to connector 22, and a second end attached to a hook 26. In some applications, an attractant (e.g., bait, lure, fly, etc.) may be associated with hook 26. It should be noted that, while some of the equipment depicted in FIG. 1 (e.g., rod 10 and reel 16) may be recognized by one skilled in the art as associated with a particular method of fishing (e.g., fly-casing), this disclosure may apply equally to other methods of fishing (e.g., bait-casting, spin-casting, etc.).

In one embodiment, line 18 and leader 24 have different characteristics. For example, line 18 and leader 24 may differ in strength, toughness, buoyancy, color, transparency, diameter, material, length, etc. In general, line 18 may be longer and stronger than leader 24, and leader 24 may be more transparent and/or tougher. However, it is contemplated that line 18 and leader 24 could be substantially identical or have different relative characteristics, as desired. The loose end of line 18 (i.e., the end not associated with reel 16) may generally be permanently attached to connector 22 (e.g., via a tied knot or other mechanism that may require severing of line 18 for detachment), while the first end of leader 24 may be removably attached to connector 22 (i.e., such that severing of leader 24 is not required for detachment). Any knot (e.g., a Palomar knot, an improved clinch knot, a loop knot, a swivel knot, etc.) may be used to permanently attach line 18 to connector 22.

An example connector 22 is disclosed in co-pending U.S. patent application Ser. No. 18/614,501 that was filed on Mar. 22, 2024 ("the '501 application"). The '501 application is incorporated herein in its entirety by reference.

FIG. 1 also illustrates an exemplary organizer 28 for storing any number of preprepared leaders 24. As shown in FIG. 1 and as will be explained in more detail below, organizer 28 may be connected to a belt of a user and/or worn around the neck.

Figure 2:
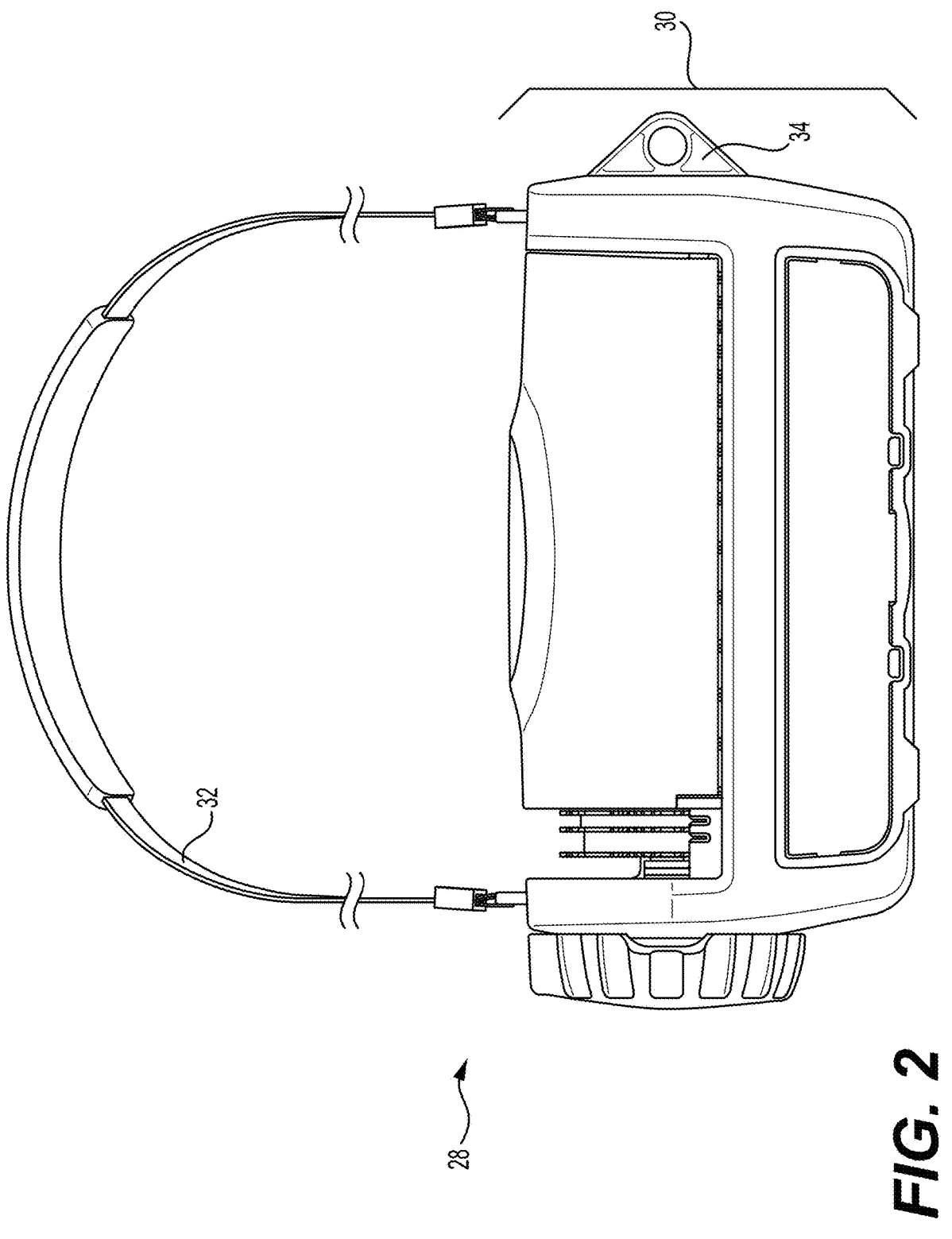
FIGS. 2, 3 and 4 are diagrammatic illustrations of an exemplary disclosed leader organizer that may form a portion of the fishing setup of FIG. 1.
Figures 3, 4:
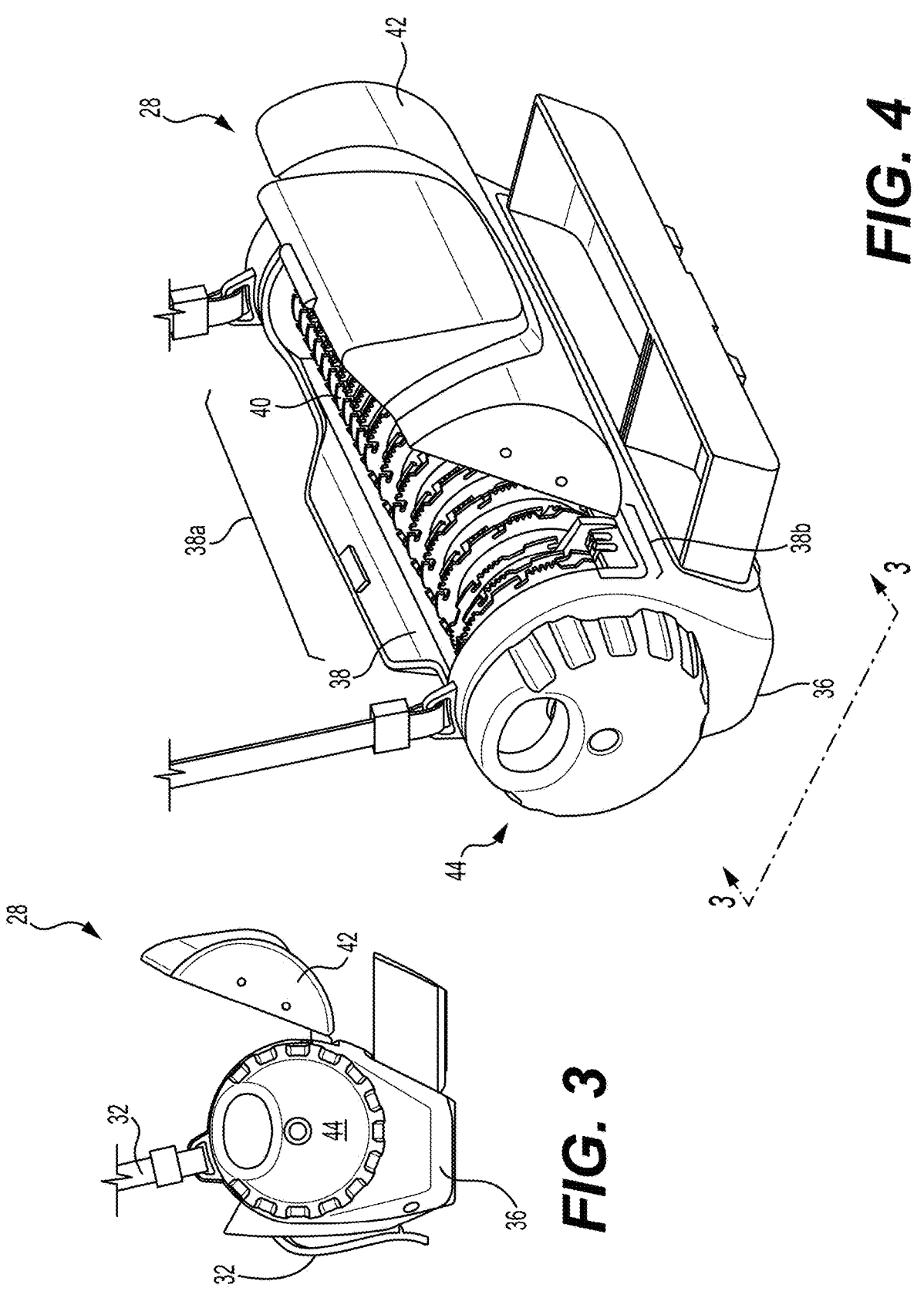

FIGS. 2, 3 and 4 illustrate organizer 28 in greater detail. As can be seen from these images, organizer 28 may include a storage unit 30 and one or more carry features 32 that allow the user to carry, wear, or otherwise hold storage unit 30 while fishing. In the embodiment of FIG. 2, carry feature 32 is a strap wearable around the back side of the user's collar or neck. Strap 32 may have ends that removably connect to corresponding features (e.g., loops, eyelets, etc.) extending from opposing sides or ends of unit 30, and a neck pad located between the ends. In the embodiment of FIG. 3, an alternative or additional carry feature 32 is shown as a belt hook or loop protruding from a back side of unit 30 (i.e., a side adjacent the user, when organizer 28 is worn by the user). The belt hook or loop may pass over or around the user's belt. It is contemplated that different and/or additional carry features 32 may be included, as desired.

In some applications, an accessory connector 34 may also protrude from or otherwise be attached to unit 30. As shown in FIG. 2, connector 34 may embody a loop, an eyelet, or similar feature that extends from a left side of unit 30 (i.e., left of the user wearing unit 30). Connector 34 may be used to connect accessory tools (e.g., pliers, knife, etc.) to unit 30. It is contemplated that connector 34 could be omitted, if desired.

Unit 30 may be an assembly of multiple components that cooperate to retrieve, store, and discharge any number of different preprepared leaders 24. The components may include, among other things, a base 36 forming a generally cylindrical enclosure 38 having an open side and being divided into a storage space 38a and a winding space 38b. A plurality of spools 40 may be stacked axially inside storage space 38a, and a lid 42 may be moveable (e.g., pivotal) to provide access to stored spools 40 or to close off the open side of enclosure 38 and secure spools 40 therein. A winding mechanism 44 may extend axially into winding space 38b. With this configuration, individual spools 40 may be taken by the user from storage space 38a and placed into winding space 38b, one-at-a-time; and mechanism 44 may thereafter be used to selectively wind one or more leaders 24 onto the spool 40 inside space 38b.

Figure 5:
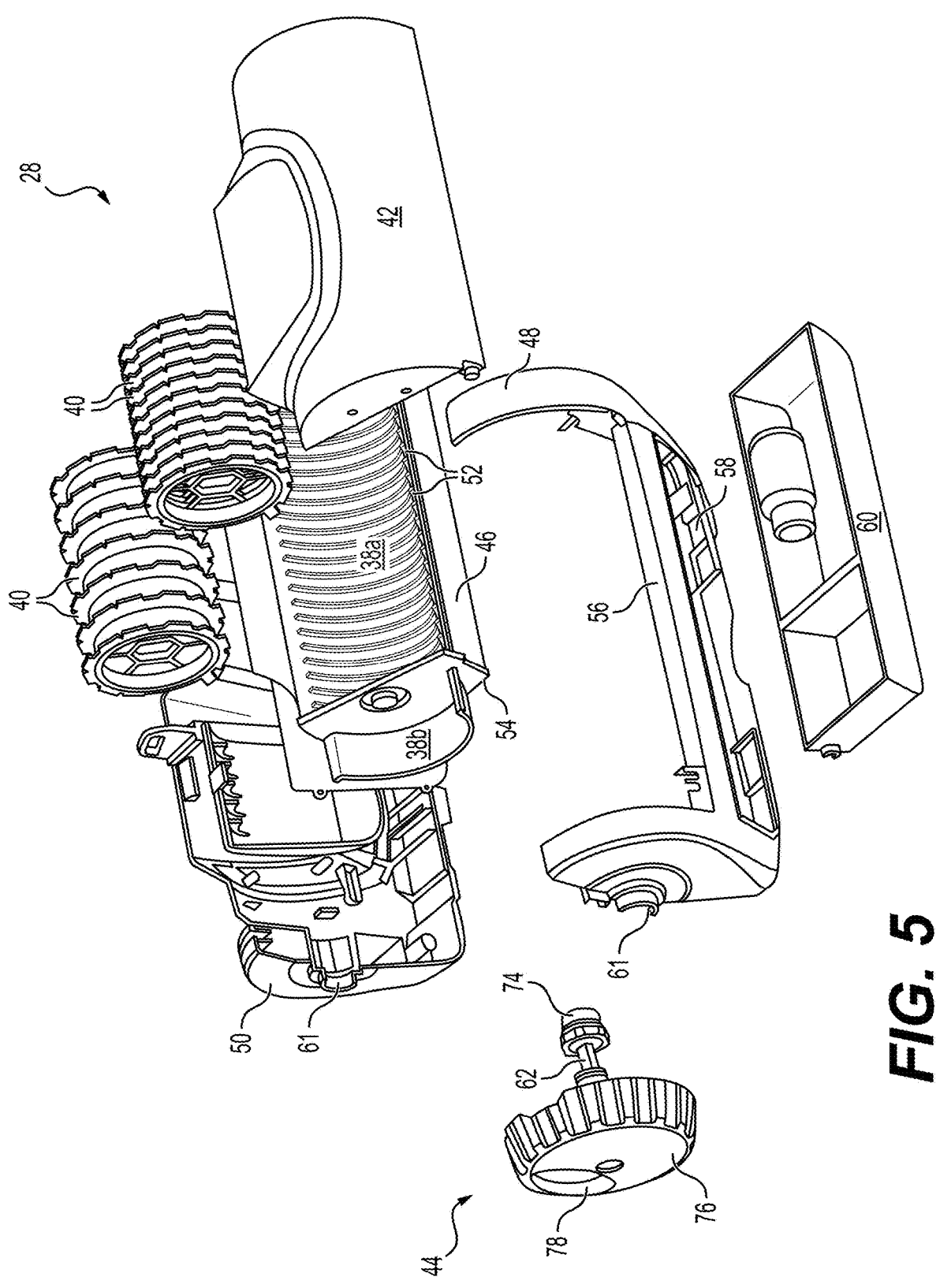
FIG. 5 is an exploded view illustration of the leader organizer of FIGS. 2-4.

Base 36 may include a cassette 46 sandwiched radially between front and rear trim plates 48, 50. As shown in FIG. 5, cassette 46 may have a general half-pipe shape, with internal annular ribs 52 that function to axially separate and secure adjacent spools 40. An end-wall 54 may axially divide cassette 46 and enclosure 38 into storage and winding spaces 38a, 38b. Front trim plate 48 may have a recess 56 formed therein that provides access to space 38, and lid 42 may have a lengthwise edge that pivotally connects to trim plate 48 at a side of recess 56. In the disclosed embodiment, an opening (e.g., a generally rectangular opening) 58 may be formed within front trim plate 48 (e.g., below recess 56, relative to the perspective of FIGS. 2, 4 and 5) to slidingly receive an accessory tray 60. One or more retention devices (e.g., magnets, detents, latches, etc.—not shown) may retain tray 60 in a closed position. Mating ends of front and rear trim plates 48, 50 may together form a bushing 61 configured to receive and rotationally support a corresponding stub shaft 62 of mechanism 44.

Figures 6, 7, 8:
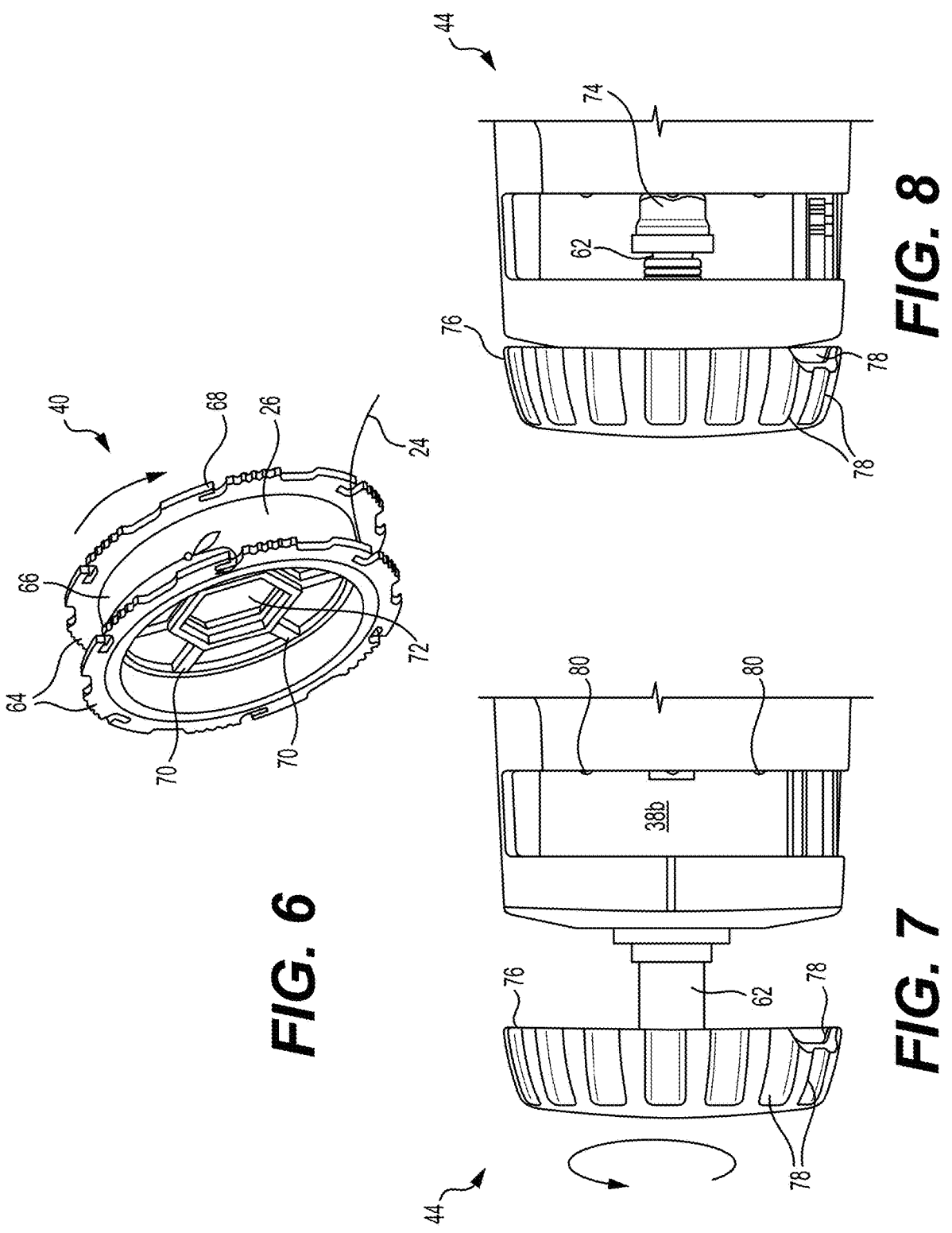
FIG. 6 is a diagrammatic illustration of an exemplary disclosed spool that may form a portion of the organizer of FIGS. 2-5.
FIGS. 7 and 8 are diagrammatic illustrations depicting an exemplary operation of the organizer of FIGS. 2-5.

As shown in FIG. 6, spool 40 may be generally hollow and cylindrical (e.g., disk-like), having end flanges 64 that extend radially further outward than an annular surface 66 disposed therebetween. Outer edges of flanges 64 may be scalloped, serrated, jagged, or otherwise include attachment features 68. The jagged edges may improve gripping of spool 40, while features 68 may be configured to receive and secure hook 26 and/or a loop formed with the opposing end of leader 24. In some embodiments, annular surface 66 may be covered with a hook-grasping material (e.g., foam) that may be used to grasp and secure hook 26 after winding of leader 24 thereon.

In some embodiments, flanges 64 may be flexible. In this embodiment, an axial length of spool 40 may be shorter than a length between corresponding ribs 52 (referring to FIG. 5), such that an interference fit is obtained between ribs 52 and flanges 64 (i.e., such that flanges 64 must flex to fit spool 40 between ribs 52). This interference fit may help to secure spools 40 and inhibit unnecessary movement or rattling. It is contemplated that instead of or in addition to flanges 64 being flexible, ribs 52 could be compliant for the same reasons, if desired.

One or more spokes 70 may extend radially inward from annular surface 66 to converge at a hub 72. As will be explained in more detail below, a lug 74 of mechanism 44 (shown in FIGS. 5, 7 and 8) may be configured to engage hub 72 when the corresponding spool 40 is placed into winding space 38b.

In the embodiment depicted in FIG. 4, two different spools 40 having differing axial lengths are included within the same unit 30. In this embodiment, a first spool 40 is one-half the axial length of a second spool 40. With this configuration, the shorter spool 40 may fit in one space between adjacent ribs 52, while the longer spool 40 may extend over one rib 52 to take up two spaces. It is contemplated that other configurations are also possible.

Lid 42 may be arcuate to generally parallel the shape of spools 40 stored inside cassette 46. This arcuate shape may provide clearance for spools 40, allowing lid 42 to close over space 38 and enclose spools 40. In one embodiment, lid 42 is at least partially transparent, such that the preprepared leaders 24 can be seen on spools 40 inside storage space 38a while lid 42 is closed.

Winding mechanism 44 may be an assembly of multiple components that cooperate to transfer a rotation (e.g., from a user's hand) to winding of a preprepared leader 24 onto an empty spool 40 inside winding space 38b. These components may include, among other things, a handle 76 connected to an end of stub shaft 62 opposite lug 74. Handle 76 may remain outside winding space 38b, while lug 74 may be moveable inside winding space 38b. Stub shaft 62 may extend from handle 76 through bushing 61 to lug 74.

Handle 76 may be generally cylindrical and include one or more gripping features 78 that facilitate rotation of mechanism 44. In one embodiment, gripping features 78 are ridges formed around an outer periphery of handle 76. In another embodiment, a finger hole may be formed within an end and/or side of handle 76 to function as a gripping feature 78. Other configurations are also contemplated.

Mechanism 44, in addition to being rotatable by a user may be axially translatable. For example, mechanism 44 may be moveable from a first or disengaged position (shown in FIG. 7) to a second or engaged position (shown in FIG. 8). When mechanism 44 is in the first position, winding space 38b may be relatively open (i.e., little if any of lug 74 or axle 62 may extend into space 38b), such that spool 40 can be placed into or retrieved from space 38b without interference from mechanism 44. When mechanism 44 is in the second position, lug 74 and axle 62 may extend through space 38b and through spool 40 (e.g., through hub 72) when spool 40 is inside space 38b. One or more retention members (e.g., magnets, springs, detents, etc.) 80 may be associated with mechanism 44 (e.g., affixed to an end of lug 74 and/or handle 76) to retain mechanism 44 in the first and/or second positions. Additionally or alternatively, one or more friction mechanisms (e.g., bumps, detents, etc.) 80 may be located inside space 38a and configured to engage spool 40 to inhibit unintended rotation of spool 40.

It should be noted that, while hand rotation of mechanism 44 has been described, mechanism 44 could be rotated in an alternative or additional manner, if desired. For example, a torsional spring and ratcheting mechanism could be associated with handle 76, such that the spring became loaded as a leader 24 was unwound from spool 40. Thereafter, a next leader 24 could be wound back onto the empty spool 40 using the potential energy stored in the loaded spring (e.g., by releasing the ratcheting mechanism). Other means for winding leader 24 onto an empty spool 40 could include a motor (e.g., a vacuum motor, an electric motor, etc.) that selectively rotates spool 40.

In some embodiments, one or more leader guides 82 may be formed within a lip of front trip panel 48 at a side of winding space 38b. During winding or unwinding of spool 40, the corresponding leader 24 may be placed within leader guide 82 to help retain leader 24 between flanges 64 during winding. As shown in FIGS. 4 and 5, leader guide 82 may embody a slit or channel that is oriented generally orthogonal to a rotation direction of spool 40. It is contemplated that leader guide 82 could be coated or otherwise formed to have a smooth, yet friction inducing surface that helps to retain at least some tension on leader 24 during winding.

Figures 9, 10, 11:
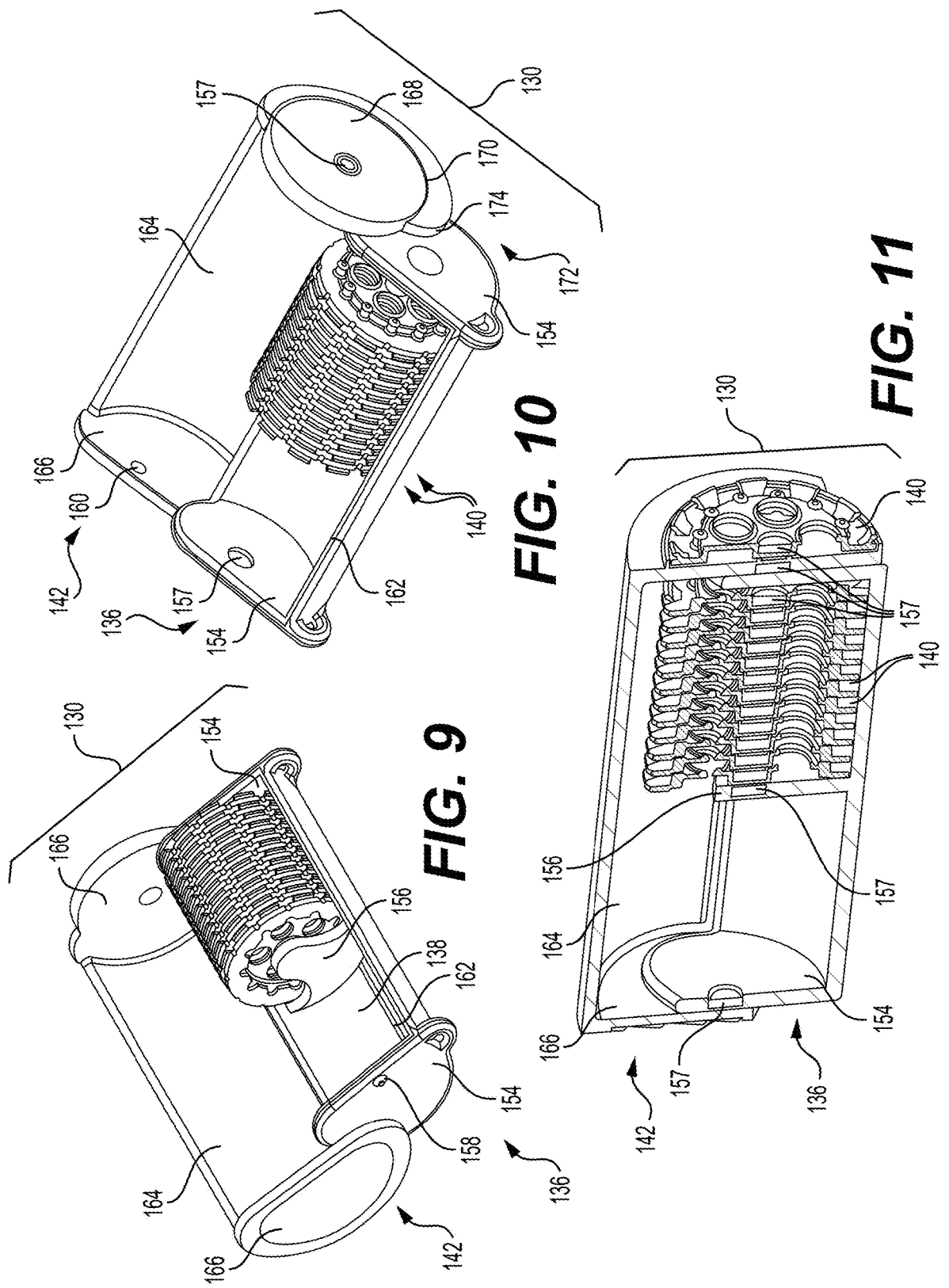
FIGS. 9, 10, and 11 are diagrammatic illustrations of another exemplary disclosed leader organizer that may form a portion of the fishing setup of FIG. 1.

Another exemplary storage unit 130 is illustrated in FIGS. 9, 10, and 11. While including similar components as unit 30 of FIGS. 2-5 and operating along similar principles, unit 130 of FIGS. 9-11 may be simpler, with fewer components that are less expensive to fabricate. In addition, organizer 130 of FIGS. 9-11 may have enhanced functionality. Unit 130 may be connectable to the same or different carry features (e.g., neck strap and/or belt clip) 32 as organizer 28 that allow the user to carry, wear, or otherwise hold storage unit 130 while fishing.

As shown in FIGS. 9-12, unit 130 may be an assembly of multiple components that cooperate to retrieve, store, and discharge any number of different preprepared leaders 24 (referring to FIG. 1). The components may include, among other things, a base 136 forming a generally cylindrical enclosure 138 having an open side and functioning as a storage space. A plurality of spools 140 may be stacked axially adjacent each other inside the storage space, and a lid 142 may be moveable (e.g., pivotal) to provide access to stored spools 140 or to at least partially close off the open side of the enclosure and secure spools 140 therein. In the disclosed embodiment of FIGS. 9-12, lid 142 does not completely close off the enclosure of base 136. The partial closure may allow visibility of spools 140 and yet still inhibit spools 140 from inadvertently falling out of base 136 (i.e., by physically capturing spools 140). However, it is contemplated that lid 142 could completely close off the enclosure (e.g., like unit 30), if desired. Unlike unit 30, unit 130 may not require or include a separate winding space and/or dedicated winding mechanism.

As shown in FIGS. 9-11, base 136 may have a general half-pipe shape that radially cups spools 140 within enclosure 138 and axially sandwiches spools 140 between corresponding end-walls 154. Base 136 may or may not be equipped with annular ribs for separating individual spools 140 (not shown in FIGS. 9-11). One or more mid-walls (e.g., walls located partway along an axial length of enclosure 138) 156 may axially divide the half-pipe shape of enclosure 138 into adjacent spool storage sections, if desired. Such a division may allow a grouping (e.g., a first half) of spools 140 to be removed together as a subassembly for easier manipulation and/or selection of individual spools 140.

Spools 140 may be retained together and/or within base 136 via magnetic attraction. For example, a button 157 of magnetic or magnetically attracted material may be attached to (e.g., partially or fully recessed within, adhered to, or otherwise connected with) end-walls 154 and/or mid-wall 156 to attract a similar button 157 attached to each spool 140. In this manner, the magnetic attraction may help to retain spools 140 together outside of base 136 and/or within enclosure 138 of base 136, even when lid 142 is in the open position. A detent 158 (shown only in FIG. 9) may be located at one or both end-walls 154 of base 136 to engage a similar feature 160 (shown only in FIG. 10) in lid 142 and help keep lid 142 closed, if desired.

In some applications, it may be desirable to inhibit rotation of spools 140 within base 136. For example, spools 140 may be selectively clocked by a user to a desired display orientation during insertion into base 136, and that orientation should be maintained. For this purpose, a locking feature 162 (e.g., an axially oriented rib) may extend lengthwise along an inner annular surface of base 136. As will be explained in more detail below, feature 162 may be configured to engage one or more (e.g., each of) spools 140 to inhibit rotation.

Lid 142 may generally mirror the shape of base 136. For example, lid 142 may have a general half-pipe shape that provides clearance for spools 140 within an enclosure 164 between corresponding end-walls 166. Lid 142 may be longer than base 136, such that end walls 166 extend axially past and at least partially enclose end walls 154 of base 136 when lid 142 is pivoted to the closed position. In one embodiment, lid 42 is at least partially transparent, such that the preprepared leaders 24 can be seen on spools 140 inside storage space 138 while lid 142 is closed.

In one example, a pivot axis extending between lid 142 and base 136 may be offset from their general centers (e.g., offset from the centers of the half-pipe shapes), such that a side of lid 142 may interfere with a side of base 136 at an open position. This interference may help to stabilize lid 142 at the open position, such that lid 142 may function as a shelf and support active spools 140 or other equipment. In some embodiments, lid 142 may pivot through an angle of about 90-180 degrees, from the closed to the open position.

Figures 12, 13, 14:
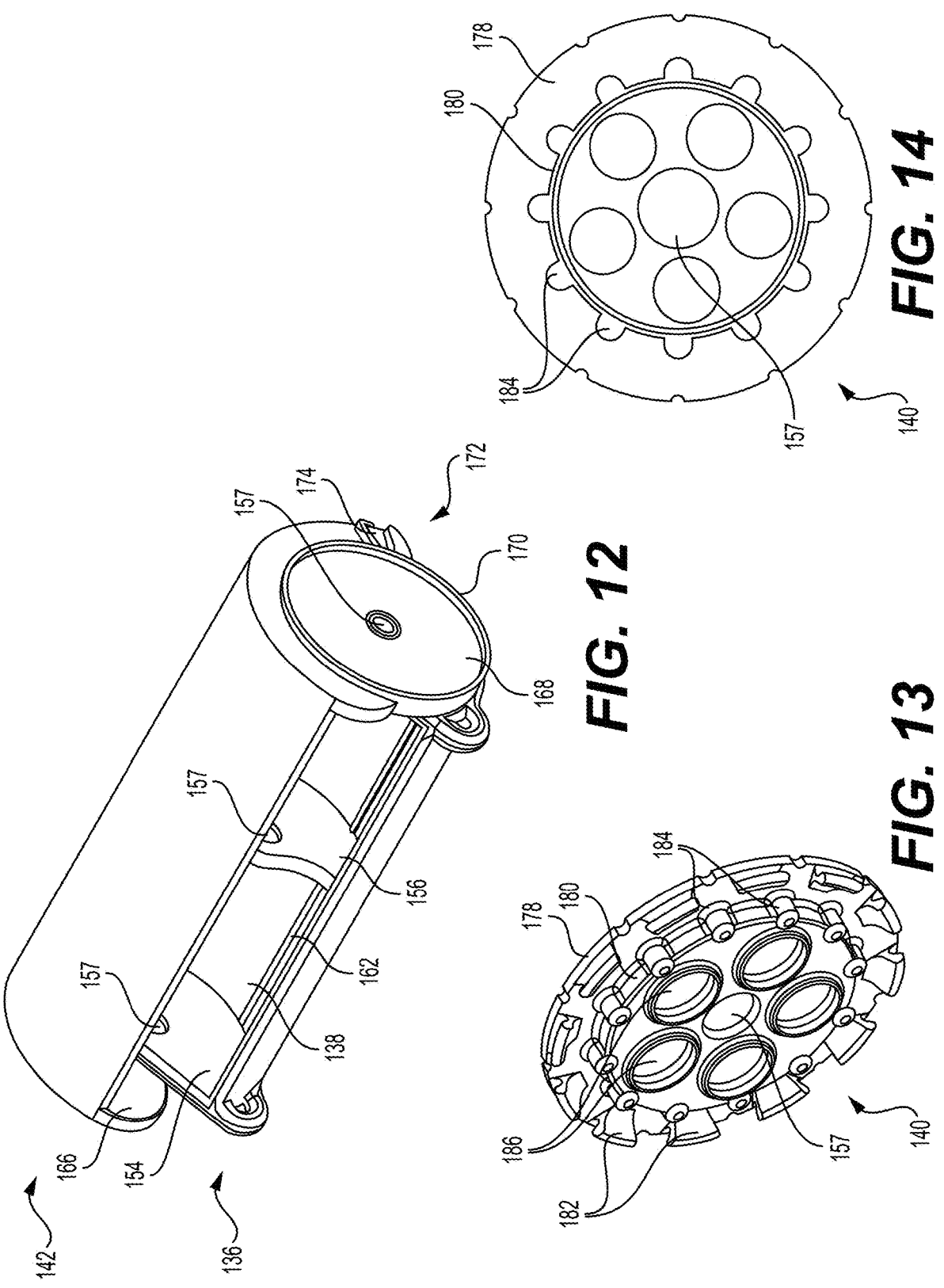
FIG. 12 is a diagrammatic illustration of an exemplary base and lid that may form a portion of the organizer of FIGS. 9-11.
FIGS. 13 and 14 are diagrammatic illustrations of another exemplary disclosed spool that may form a portion of the organizer of FIGS. 9-11.

While no separate winding space is enclosed within unit 130, a winding location may be formed at one or both outer ends of lid 142. As shown in FIGS. 10-12, the winding location may include a generally planar flange 168 having an outer lip 170 that protrudes axially outward from flange 168 and away from enclosure 138. An inner diameter of lip 170 may be larger than an outer diameter of spool 140, such that spool 140 may nest inside of lip 170 and against flange 168. This may help to locate and/or radially capture spool 140 during winding. A button 157 (described above) may be mounted at a center of flange 168 and extend axially a distance away from flange 168. This button 157 may be configured to attract a similar button 157 attached to spool 140, thereby retaining spool 140 at the winding location. The extension distance of button 157 away from flange 168 may be designed to ensure that spool 140 does not rub against the face of flange 168 (i.e., that an axial space is maintained therebetween) during winding, which may help to reduce friction associated with the winding. It should be noted that the winding location described above as being associated with lid 142 may alternatively or additionally be associated with base 136, if desired.

It should be noted that, while magnetic latching as been described above as a way to mount spool 140 at the winding location, other ways for mounting are contemplated. For example, a compliant snap-on/snap-off engagement or detent may be similarly effective.

A leader guide 172 may be provided within or adjacent lip 170, at a side of the winding location. During winding or unwinding of spool 140, the corresponding leader 24 may be placed within leader guide 172 to help radially align leader 24 with spool 140. As shown in FIG. 10, leader guide 172 may embody a slit, hooked recess, angled channel, or similar feature that is oriented generally orthogonal to a rotation direction of spool 140. Leader guide 172 may be fitted with a tensioner 174 or otherwise formed to have a smooth, yet friction-inducing surface that helps to retain at least some tension on leader 24 during winding. In one embodiment, tensioner 174 is a compliant material (e.g., foam, neoprene, etc.) adhered within leader guide 172 that at least partially wraps around leader 24 24 (referring to FIG. 1) to add friction to leader during winding.

An exemplary spool 140 is illustrated in detail in FIGS. 13 and 14. Like spool 40 of FIG. 6, spool 140 of FIGS. 13 and 14 may be generally hollow and cylindrical. However, in contrast to spool 40, spool 140 may have only a single end flange 178 that extends radially further outward than an annular surface 180 formed adjacent to flange 178. An outer edge of flange 178 may be scalloped, serrated, jagged, or otherwise include gripping features that help to manually manipulate spool 140. An annular leader channel 182 may be formed at a radial location between surface 180 and the outer edge of flange 178. Channel 182 may be configured to receive leader 24 (referring to FIG. 1) during winding. In some applications, channel 182 may be interrupted (e.g., at regular intervals), such that each interruption may function to receive and secure hook 26 and/or a loop formed with the opposing end of leader 24. In some embodiments, channel 182 may be coated with a hook-grasping material (e.g., foam, neoprene, rubber, etc.) that may be used to grasp and secure leader 24 and/or hook 26.

As mentioned above, it may be desirable to clock spools 140 within enclosure 138 of base 136 (e.g., via rib 162). Additionally or alternatively, it may be desirable in some applications to selectively clock one spool 140 relative to an adjacent spool 140. This may be helpful when the lure material associated with hooks 26 is bulky, making it difficult to place hooks 26 immediately adjacent each other and still provide adequate space therebetween (e.g., space adequate to see and/or grasp each individual hook 26). For this reason, one or more clocking features 184 may be provided on spool 140 itself that engage corresponding features of an adjacent spool 140 and thereby inhibit relative rotation when spools 140 are axially stacked against each other. In the disclosed embodiment, clocking features 184 embody cylindrical protrusions arranged around annular surface 180. These protrusions may be hollow, such that open-sided recesses are formed at an opposing side of flange 178. With this configuration, the protrusions of one spool 140 may be inserted into the recesses of an adjacent spool 140 when the two spools 140 are stacked against each other, and this engagement may inhibit relative rotation. In the disclosed embodiment, 12 clocking features 184 are included, such that clocking at every 30° may be possible. It is contemplated that other numbers and/or shapes of engaging features may be formed at opposing sides of spool 140 to inhibit relative rotations, if desired.

One or more finger holes 186 may be provided within a face of spool 140 located at an end of annular surface 180 opposite flange 178. In the disclosed embodiment, fiver finger holes 186 are provided in an equally distributed manner around button 157. With this configuration, a rotation input from a user's hand may be transformed to winding of a preprepared leader 24 onto an empty spool 140 placed at the winding location.

Figure 15:
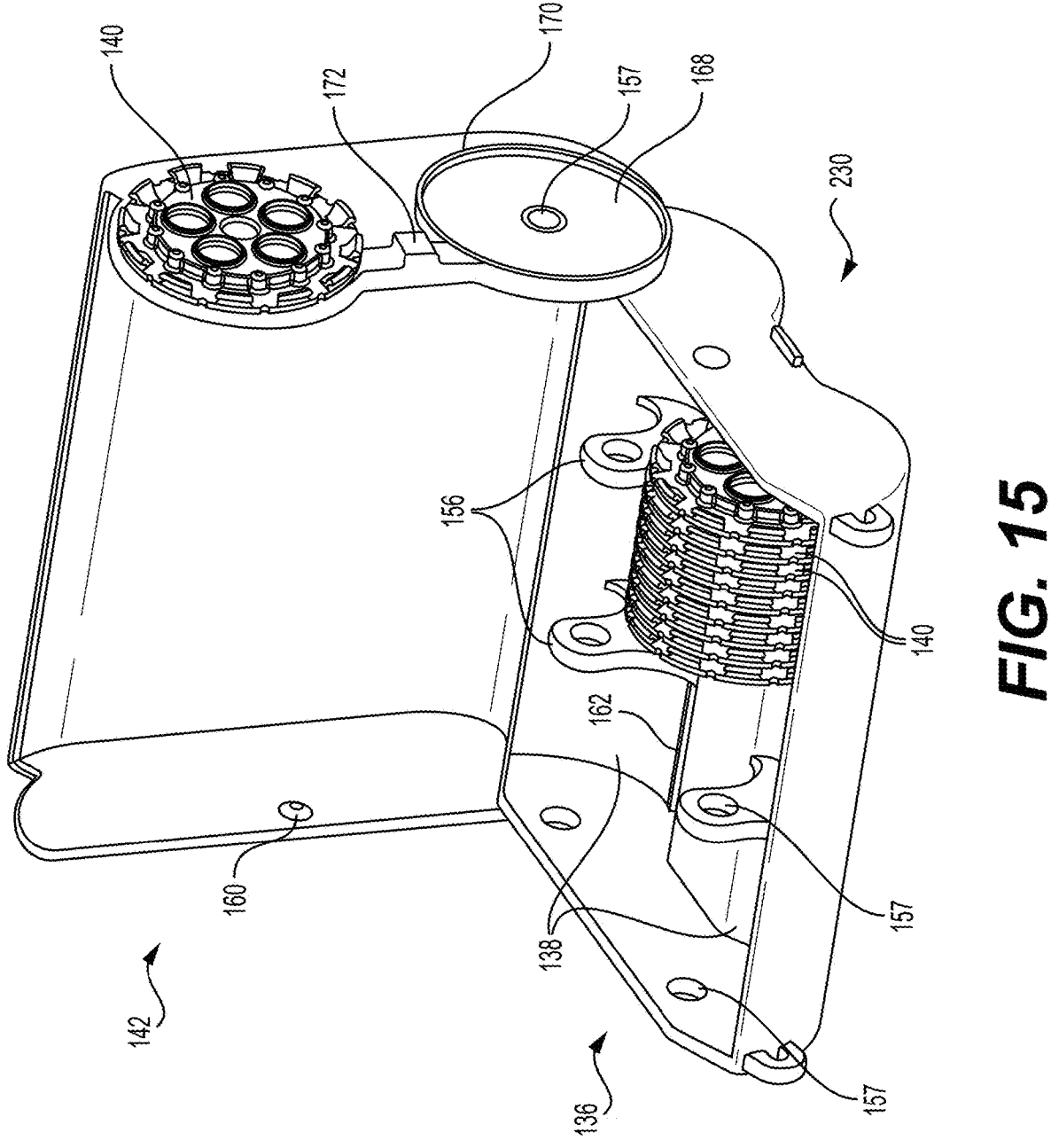
FIG. 15 is a diagrammatic illustration of another exemplary disclosed leader organizer that may form a portion of the fishing setup of FIG. 1.

Another exemplary storage unit 230 is illustrated in FIG. 15. While including similar components as unit 130 of FIGS. 9-11 and operating along similar principles, unit 230 of FIG. 15 may be larger and accommodate a greater number of (e.g., two, three, or four times as many) spools 140. For example, unit 230 may have two separate half-pipe enclosures 138 arranged into adjacent rows. In some applications, the rows may accommodate a different (e.g., fewer or greater) number of spools 140 divided into two, three, four or more subassemblies by any number of mid-walls 156. One or more (e.g., two or more) winding locations may be provided on the outside of unit 230 (e.g., one at the end of each row of spools 140). In the disclosed embodiment, a single common leader guide 172 is used for both winding locations, although other configurations (e.g., dedicated leader guides 172) are contemplated.

INDUSTRIAL APPLICABILITY

The disclosed organizers may be used to store a plurality of preprepared leaders 24. An example method of using the disclosed organizers will now be described in detail with reference to FIGS. 1-15.

To store a prepared leader 24 in unit 30, an empty spool 40 may be placed into winding space 38b, and mechanism 44 may be pushed inward to engage lug 74 with hub 72. One end of leader 24 (e.g., the loop end) may be engaged with feature 68 and an adjacent portion of leader 24 may be placed into guide 82. Handle 76 may then be rotated (e.g., by hand) to spin spool 40 inside of winding space 38b and wind leader 24 around spool 40. This rotation may continue until the opposing end of leader 24 (i.e., until hook 26) reaches guide 82. Mechanism 44 may then be pulled outward to disengage lug 74 with hub 72. Spool 40 may then be retrieved from space 38b, and hook 26 may be engaged with the same or another feature 78 of spool 40. Spool 40 may then be placed into storage space 38a, such that flanges 64 are wedged between ribs 54.

To use a stored leader 24, a full spool 40 may be taken from storage space 38a and placed into winding space 38b. Mechanism 44 may then be engaged, and one end of leader 24 (e.g., hook 26) may be detached from feature 78 of spool 40. Leader 24 may be passed through guide 82, and hook 26 may be used to pull the rest of leader 24 from spool 40 as spool 40 spins within winding space 38b. The loop end may then be attached to connector 22 (referring to FIG. 1). The empty spool 40 may remain in winding space 38b until swapping of leaders 24 or placed back inside storage space 38a, as desired.

It is contemplated that spool 40 may be unwound without placement into winding space 38b and/or without the use of mechanism 44, if desired. For example, the center of spool 40 may simply be pinched between the index finger and thumb of the user, and leader 24 may be pulled via hook 26 while spool 40 spins in the user's hand.

Many advantages over the prior art are provided by unit 30. For example, the disclosed organizer is simple, with few moving parts. This simplicity may make assembly easy and quick, thereby decreasing a cost of the organizer. Further, because axle 62 and lug 74 pass through only a single spool 40 (i.e., only the spool 40 loaded into winding space 38a), it may be each to access each individual spool 40 in storage space 38a (e.g., for loading, cleaning, and/or preparation of the spools). Further, because only one spool is engaged with mechanism 40 at a time, it may be easy for the user to know which spool 40 is being wound or unwound.

To store a prepared leader 24 in unit 130 or 230, an empty spool 140 may be placed into the winding location at the end of the respective unit. For example, the button 157 of the selected spool 140 may be magnetically latched against the mating button 157 at the center of the winding location, with the generally planar face of flange 178 oriented towards the end of the unit and radially inside of lip 170. One end of leader 24 (e.g., the loop end) may be engaged with an interrupted portion of leader channel 182 and an adjacent section of leader 24 may be placed into guide 172. The user may then insert a finger into or press the finger against one of holes 186 and rotate spool 140 at the winding location to wind leader 24 around leader channel 182. This rotation may continue until the opposing end of leader 24 (i.e., hook 26) reaches guide 172. Spool 140 may then be retrieved from the winding location, and hook 26 may be engaged with the same or another interrupted portion of leader channel 182. Spool 140 may then be placed into storage space 138 at a desired clock position, such that the gripping features of spool 140 engage locking feature 162 and spool 140 remains in the desired position.

To use a stored leader 24, a full spool 140 may be taken from storage space 138 and placed into the winding location at the end of the respective unit 130 or 230. The hook end of leader 24 may then be disengaged from the interrupted portion of leader channel 182. Leader 24 may be passed through guide 172, and hook 26 may be used to pull the rest of leader 24 from spool 140 as spool 140 spins at the winding location. The loop end of leader 24 may then be attached to connector 22 (referring to FIG. 1). The empty spool 140 may remain in the winding location until swapping of leaders 24 or placed back inside storage space 138, as desired.

As with spool 40, it is contemplated that spool 140 may be unwound without placement into the winding location, if desired. For example, the center of spool 140 may simply be pinched between the index finger and thumb of the user, and leader 24 may be pulled via hook 26 while spool 140 spins in the user's hand.

Many advantages over the prior art are provided by units 130 and 230. For example, the disclosed units are even simpler and have fewer moving parts than unit 30. This may allow for injection molding of most components and for quick and easy assembly. Such fabrication techniques help to decrease the cost of the organizer.

It will be apparent to those skilled in the art that various modifications and variations can be made to the disclosed leader organizer. Other embodiments will be apparent to those skilled in the art from consideration of the specification and practice of the disclosed leader organizer. It is intended that the specification and examples be considered as exemplary only, with a true scope being indicated by the following claims and their equivalents.

What is claimed is:

1. An organizer for storing a plurality of fishing leaders, comprising:
   a base having an internal storage space;
   a plurality of spools removably received within the internal storage space and each configured to receive a different one of the plurality of fishing leaders;
   a winding location positioned external to the base and configured to removably receive at least one of the plurality of spools; and
   a mounting device located between the base and the at least one of the plurality of spools and configured to rotatably retain the at least one of the plurality of spools at the winding location by engagement with an external surface of the at least one of the plurality of spools.

2. The organizer of claim 1, further including a lid configured to engage the base and move between an open position at which the plurality of spools are accessible and a closed position at which the plurality of spools are secured in the base.

3. The organizer of claim 2, wherein the winding location is formed integral to the lid.

4. The organizer of claim 3, wherein:
   the lid includes an elongated half-pipe shape; and
   the winding location is positioned at an external axial end of the lid.

5. The organizer of claim 1, wherein the winding location includes:
   a generally planar flange; and
   an annular lip that surrounds the generally planar flange and extends axially away from the generally planar flange.

6. The organizer of claim 1, wherein:
   each of the plurality of spools is disk-like; and
   the spools of the plurality of spools are stacked axially end-to-end within the internal storage space.

7. The organizer of claim 6, wherein each of the plurality of spools includes a finger hole to allow manual winding after latching at the winding location.

8. The organizer of claim 6, wherein each of the plurality of spools includes:

at least one flange; and an annular surface extending axially from a face of the at least one flange.

9. The organizer of claim 8, wherein each of the plurality of spools also includes at least one clocking feature configured to retain a desired clocking orientation relative to an adjacent spool.

10. An organizer for storing a plurality of fishing leaders, comprising:

a base having an internal storage space;

a plurality of spools removably received within the internal storage space and each configured to receive a different one of the plurality of fishing leaders;

a winding location positioned external to the base and configured to removably receive at least one of the plurality of spools;

a generally planar flange;

an annular lip that surrounds the generally planar flange and extends axially away from the generally planar flange; and a leader guide located adjacent the outer lip.

11. An organizer for storing a plurality of fishing leaders, comprising:

a base having an internal storage space;

a plurality of spools removably received within the internal storage space and each configured to receive a different one of the plurality of fishing leaders; and a winding location positioned external to the base and configured to removably receive at least one of the plurality of spools, wherein the winding location includes a magnet configured to retain the at least one of the plurality of spools at the winding location during winding.

12. An organizer for storing a plurality of fishing leaders, comprising:

a base having an internal storage space;

a plurality of spools removably received within the internal storage space and each configured to receive a different one of the plurality of fishing leaders; and a winding location positioned external to the base and configured to removably receive at least one of the plurality of spools, wherein the base includes an elongated half-pipe shape; and the plurality of spools is retained in the internal storage space of the base via magnetic attraction.

13. The organizer of claim 12, further including a mid-wall axially dividing the internal storage space into multiple sections.

14. The organizer of claim 12, further including a locking feature inside the base and configured to maintain a desired clocking orientation of the plurality of spools.

15. An organizer for storing a plurality of fishing leaders, comprising:

a base having an internal storage space;

a plurality of spools removably received within the internal storage space and each configured to receive a different one of the plurality of fishing leaders; and a winding location positioned external to the base and configured to removably receive at least one of the plurality of spools, wherein each of the plurality of spools is magnetically latched to an adjacent spool when stacked axially end-to-end.

16. An organizer for storing a plurality of fishing leaders, comprising:

a base having an internal storage space;

a plurality of spools removably received within the internal storage space and each configured to receive a different one of the plurality of fishing leaders; and a winding location positioned external to the base and configured to removably receive at least one of the plurality of spools, wherein each of the plurality of spools includes:

at least one flange;

an annular surface extending axially from a face of the at least one flange; and an annular leader channel radially disposed between an annular surface and an outer edge of the at least one flange.

17. The organizer of claim 16, wherein the annular leader channel is interrupted to provide locations for retaining a hook or a leader loop.

18. An organizer for storing a plurality of fishing leaders, comprising:

a base having an internal storage space;

a plurality of spools removably received within the internal storage space and each configured to receive a different one of the plurality of fishing leaders; and a winding location positioned external to the base and configured to removably receive at least one of the plurality of spools, wherein:

the internal storage space is configured to receive two rows of axially stacked spools;

the winding location is a first winding location; and the organizer includes a second winding location adjacent the first winding location.

19. An organizer for storing a plurality of fishing leaders, comprising:

a base having an internal storage space;

a plurality of spools removably received within the internal storage space and each configured to receive a different one of the plurality of fishing leaders; and a winding location positioned external to the base and configured to removably receive at least one of the plurality of spools, wherein the winding location is configured to receive only a single one of the plurality of spools at a time.

20. An organizer for storing a plurality of fishing leaders, comprising:

a base having a half-pipe shape and forming an internal storage space;

a plurality of disk-like spools removably received within the internal storage space, each configured to receive a different one of the plurality of fishing leaders;

a lid configured to pivotally engage the base and move between an open position at which the plurality of spools are accessible and a closed position at which the plurality of spools are secured in the base; and a manual winding location formed at an external axial end of the lid and configured to magnetically latch one of the plurality of spools at a time.

* * * * *